(12) United States Patent
Prokhorov

(10) Patent No.: US 6,682,122 B1
(45) Date of Patent: Jan. 27, 2004

(54) SUPPLEMENTAL SUN VISOR SYSTEM FOR AUTOMOTIVE VEHICLE

(75) Inventor: Danil V. Prokhorov, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 10/065,821

(22) Filed: Nov. 22, 2002

(51) Int. Cl.[7] ................................................ B60J 3/00
(52) U.S. Cl. ..................................... 296/97.8; 296/97.4
(58) Field of Search ............................ 296/97.8, 97.4, 296/97.1

(56) References Cited

U.S. PATENT DOCUMENTS

| | | | |
|---|---|---|---|
| 2,289,644 A | | 7/1942 | Gano, Jr. |
| 2,549,395 A | * | 4/1951 | Short, Sr. |
| 4,810,023 A | | 3/1989 | Kawada |
| 4,836,599 A | | 6/1989 | Svensson |
| 4,958,879 A | * | 9/1990 | Gillum .................. 296/97.8 X |
| 4,988,139 A | | 1/1991 | Yamada |
| 4,989,910 A | | 2/1991 | Mersman et al. |
| 5,192,110 A | * | 3/1993 | Mykytiuk et al. ......... 296/97.8 |
| 5,328,227 A | * | 7/1994 | Pax, Jr. et al. ............. 296/97.8 |
| 5,443,300 A | * | 8/1995 | Mohammed ........... 296/97.8 X |
| 5,445,427 A | | 8/1995 | Vandagriff |
| 5,720,508 A | * | 2/1998 | Mohammed ........... 296/97.8 X |
| 6,406,086 B2 | | 6/2002 | Bauer et al. |
| 6,488,328 B2 | * | 12/2002 | Quapil ....................... 296/97.8 |

FOREIGN PATENT DOCUMENTS

JP          6-7621          1/1994

* cited by examiner

*Primary Examiner*—Joseph D. Pape
(74) *Attorney, Agent, or Firm*—Gigette M. Bejin

(57) ABSTRACT

A sun visor system for a vision unit of an automotive vehicle includes a sliding carrier visor having a stowed position within a headliner of a vehicle and a deployed position running laterally along a portion of the vision unit between a rearview mirror mounted to the vision unit and the headliner. Laterally extending insert visors may be independently deployed from the carrier visor so as to increase the area of a vision unit, such as a windshield, being protected from glare by the present visor system.

18 Claims, 5 Drawing Sheets

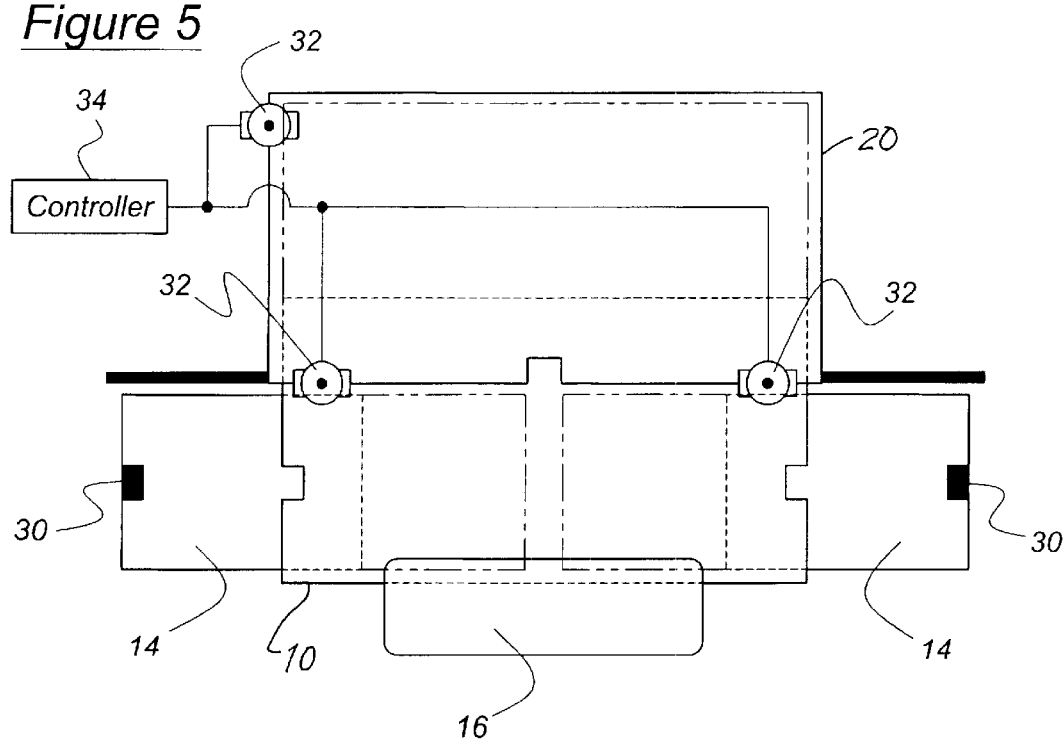

SUPPLEMENTAL SUN VISOR SYSTEM FOR AUTOMOTIVE VEHICLE

BACKGROUND OF INVENTION

1. Field of the Invention

The present invention relates to a sun visor system for an automotive vehicle.

2. Disclosure Information

Currently known sun visor systems for automotive vehicles generally include a pair of sun visors mounted to the vehicle's windshield header, for rotation about an axis extending generally transversely of the vehicle. Unfortunately, such visor systems do not include a structure capable of blocking the sun in the areas of the windshield generally adjacent the rearview mirror.

The packaging of an auxiliary sun visor system presents a challenge insofar as the auxiliary visor system must be deployable in connection with the usual primary visors. U.S. Pat. No. 4,988,139 discloses a retractable sun visor with variable shading for an automobile, with the visor being contained in a housing embedded in the roof of the vehicle. The visor of the '139 patent does not, however, function to fill the gap between the conventional sun visor and the rearview mirror, so as to provide an unbroken barrier to glare for the benefit of the vehicle's driver.

SUMMARY OF INVENTION

According to the present invention, a sun visor system for a vision unit of an automotive vehicle includes a sliding carrier visor having a stowed position within a pocket formed as a portion of a headliner, and a deployed position running laterally along a portion of a vision unit between a rear view mirror and the headliner. The sun visor system further includes a plurality of laterally extending insert visors, with each insert visor having a stowed position within said carrier visor and a deployed position extending laterally from said carrier visor.

As used herein, the term "vision unit" means either an automotive windshield or an automotive backlite, or an automotive side window, it being understood that such glazing could either be fixed or movable.

A sun visor system according to the present invention may further comprise at least one primary sun visor mounted to a vehicle headliner for rotation about an axis extending transversely of the vehicle.

A carrier visor according to the present invention may comprise a plastic housing, with the insert visors comprising plastic plates formed from such material as polycarbonate plastic or other non-metallic or metallic or composite materials.

The carrier visor is housed within a pocket comprising a space extending rearward of the vision unit between a roof skin and a headliner panel. The pocket may comprise a molded plastic unit mounted to a roof skin of the vehicle inboard of the vision unit.

According to another aspect of the present invention, a method of deploying a sun visor system for a vision unit of an automotive vehicle includes the steps of slidably moving a carrier visor from a stowed position within a headliner to a deployed position in which the carrier visor extends laterally along a portion of the vision unit, and slidably moving a plurality of insert visors from stowed positions within the carrier visor to deployed positions in which the insert visors extend along the vision unit laterally from the carrier visor. Finally, a third step according to the present method involves rotatably moving at least one primary sun visor from a stowed position which the primary sun visor abuts the headliner to a deployed position which the primary visor abuts the vision unit.

It is an advantage of the present invention that the inventive supplemental sun visor system provides a barrier to ingress of solar glare from a portion of a vision unit such as a windshield which is not covered by a primary visor system.

It is an advantage of the present invention that the present supplemental sun visor system may be used alone to block glare without the need for using a primary sun visor.

It is a further advantage of the present invention that the present supplemental sun visor system may be housed in the headliner and is therefore unobtrusive when in a stowed position.

Other advantages, as well as features and objects of the present invention, will become apparent to the reader of this specification.

BRIEF DESCRIPTION OF DRAWINGS

FIG. 5 is a plan view illustrating a supplemental visor system according to the present invention.

DETAILED DESCRIPTION

Figure 1:
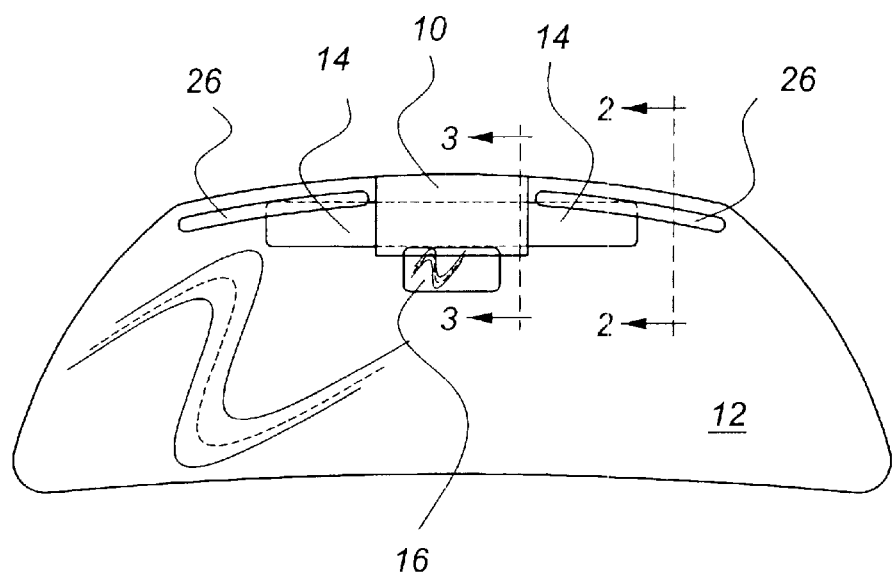
FIG. 1 is a plan view from inside the passenger compartment of a visor system according to the present invention.
Figure 2:
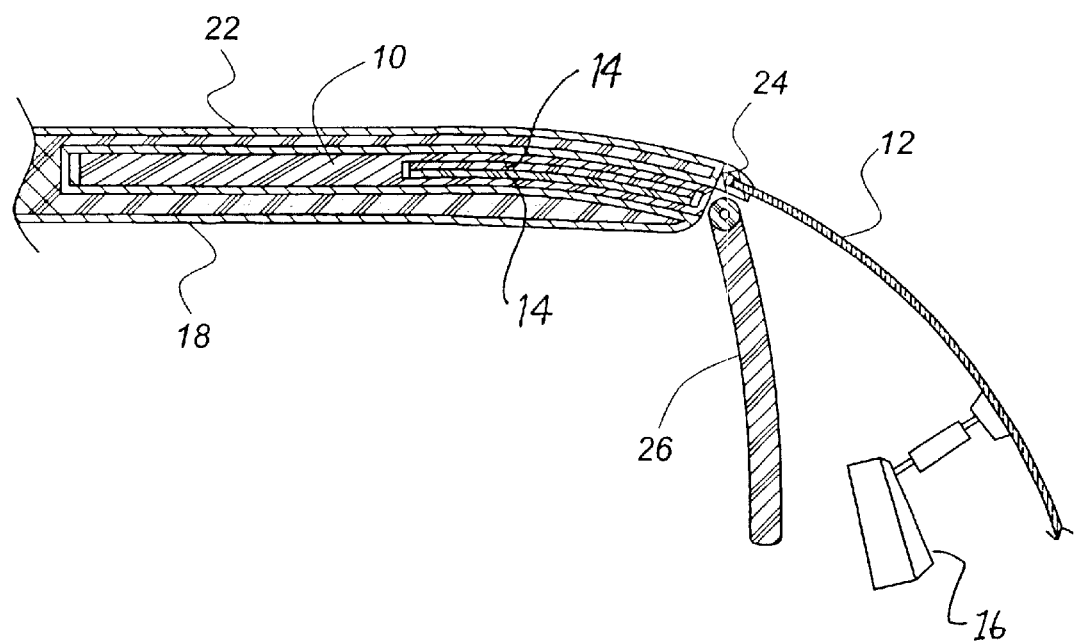
FIG. 2 is a sectional view illustrating a visor system according to present invention, taken along the line 2—2 of FIG. 1.

FIGS. 1 and 2 illustrate windshield vision unit 12 having a pair of primary sun visors 26 which are mounted to windshield header 24 or to headliner 18, for rotation about an axis extending generally transversely of the vehicle. FIG. 1 further illustrates the well known gap extending between the inboard ends of primary visors 26. This gap is shown as being filled by carrier visor 10, which is slidably deployed from headliner 18. Carrier visor 10 houses two insert visors 14 which preferably comprise tinted plastic plates. Alternatively, insert visors 14 may comprise composite materials or other metallic or nonmetallic materials such as carbon fiber composites. Many such materials are known to those skilled in the art and suggested by this disclosure.

Figure 3:
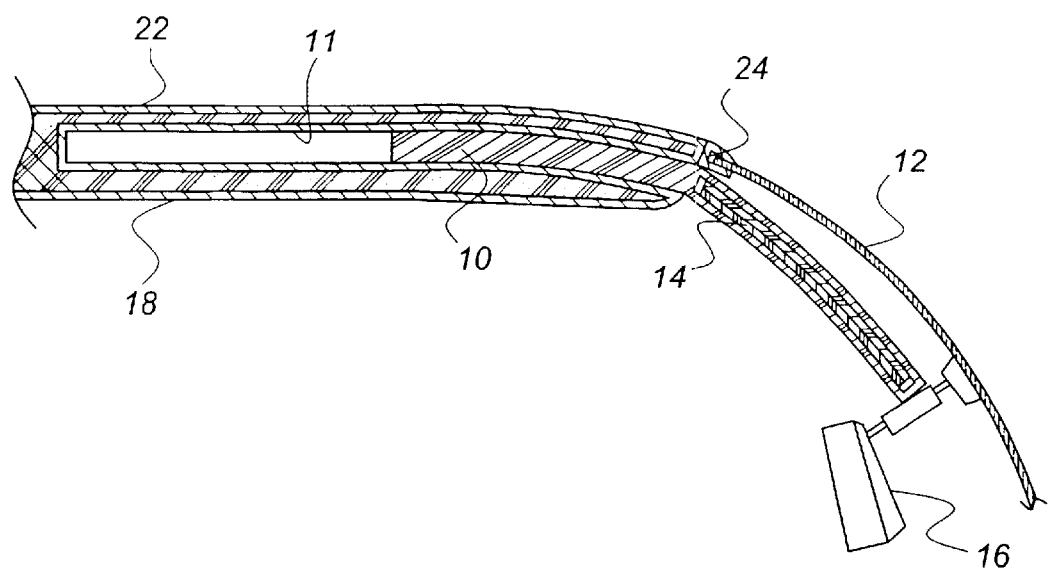
FIG. 3 is a sectional view taken through a supplemental sun visor system according to the present invention, taken along the line 3—3 of FIG. 1.

FIG. 3 illustrates the initial deployment of carrier visor 10. As the first step, carrier visor 10 is slid forward of the vehicle and into proximity with rearview mirror 16. Thereafter, insert visors 14 are slidably moved laterally from carrier visor 10. The result of these sliding movements is shown in FIG. 5, wherein each insert visors 14 is shown to be extended laterally from carrier visor 10. The present supplemental sun visor system runs laterally along a considerable portion of the vision unit to which the visor is applied.

Figure 4:
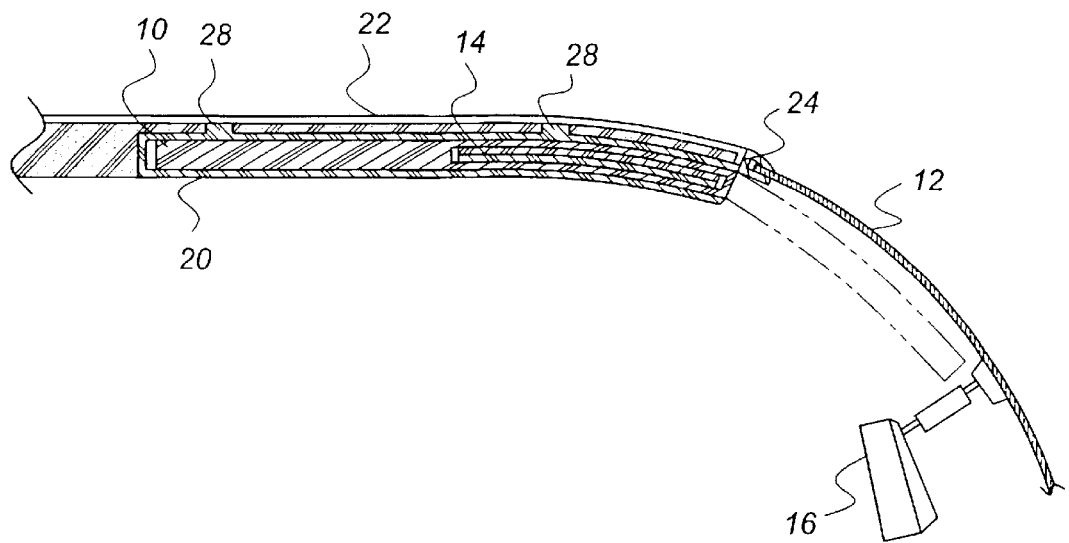
FIG. 4 illustrates a second embodiment for housing a supplemental visor system according to the present invention.

Carrier visor 10 may be mounted either within pocket 11 formed as a portion of headliner 18, as is shown in FIG. 3, with pocket 11 extending rearward of vision unit 12 between roof skin 22 and headliner 18. Alternatively, carrier visor 10 may be stowed within a molded plastic housing 20 shown in FIG. 4. If this structure is used, molded plastic housing 20 may be mounted by means of mounts 28 to roof skin 22. In the configuration of FIG. 4, headliner 18 will adjoin plastic housing 20. In any case, carrier visor 10 and insert visor 14 will be deployable as described herein above.

Once carrier visor 10 has been moved to the deployed position, either manually or by a motor drive, insert visors 14 may be deployed manually by pulling on pull tabs 30 which are fixed to each of insert visors 14. As shown in FIG. 5, a plurality of motor drives 32 may be operated by controller 34 for the purpose of deploying not only carrier visor 10, but also insert visors 14. Such drives may be drawn from the class of automotive hardware motor drives known to those skilled in the art and suggested by this disclosure.

Although the present invention has been described in connection with particular embodiments thereof, it is to be understood that various modifications, alterations and adaptations may be made by those skilled in the art without departing from the spirit and scope of the invention. For example, the various component parts of the present visor system could be constructed from nonmetallic composites and other materials such as carbon fiber, or from metallic materials. In any event, it is intended that the invention be limited only by the appended claims.

What is claimed is:

1. A sun visor system for a vision unit of an automotive vehicle, with said sun visor system comprising:
    a sliding carrier visor having a stowed position within a pocket formed as a portion of a headliner, and a deployed position running laterally substantially parallel to a portion of a vision unit between a rear view mirror and the headliner; and
    a plurality of laterally extending insert visors, with each insert visor having a stowed position within said carrier visor and a deployed position extending laterally from said carrier visor.

2. A sun visor system according to claim 1, further comprising at least one primary sun visor mounted to the headliner for rotation about an axis extending transversely of the vehicle.

3. A sun visor system according to claim 1, wherein said carrier visor comprises a plastic housing.

4. A sun visor system according to claim 1, wherein said insert visors comprise plastic plates.

5. A sun visor system according to claim 1, wherein said insert visors comprise polycarbonate plates.

6. A sun visor system according to claim 1, wherein said insert visors comprise carbon fiber composite plates.

7. A sun visor system according to claim 1, wherein said insert visors comprise plates formed from composite material.

8. A sun visor system according to claim 1, wherein said pocket comprises a space extending rearward of the vision unit between a roof skin and a headliner panel.

9. A sun visor system according to claim 1, wherein said pocket comprises a molded plastic housing mounted to a roof skin of the vehicle rearward of the vision unit.

10. A sun visor system according to claim 1, further comprising at least one primary sun visor mounted to a vision unit header for rotation about an axis extending transversely of the vehicle.

11. A method for deploying a supplemental sun visor system for a vision unit of an automotive vehicle, comprising the steps of:
    slidably moving a carrier visor from a stowed position within a headliner to a deployed position in which the carrier visor extends laterally substantially parallel to a portion of the vision unit; and
    slidably moving at least one insert visor from a stowed position within said carrier visor to a deployed position in which said insert visor extends along the vision unit laterally from said carrier visor.

12. A method for deploying a sun visor system for a vision unit of an automotive vehicle, comprising the steps of:
    slidably moving a carrier visor from a stowed position within a headliner to a deployed position in which the carrier visor extends laterally substantially parallel to a portion of the vision unit;
    slidably moving a plurality of insert visors from stowed positions within said carrier visor to deployed positions in which said insert visors extend along the vision unit laterally from said carrier visor; and
    rotatably moving at least one primary sun visor from a stowed position in which the primary sun visor abuts the headliner to a deployed position in which the primary sun visor abuts the vision unit.

13. A sun visor system for a vision unit of an automotive vehicle, with said sun visor system comprising:
    a sliding carrier visor having a stowed position within a pocket formed as a portion of a headliner, and a deployed position running laterally substantially parallel to a central upper portion of a vision unit between a rear view mirror mounted to the vision unit, and the headliner;
    a plurality of laterally extending insert visors, with each insert visor having a stowed position within said carrier visor and a deployed position extending laterally from said carrier visor; and
    at least one primary sun visor mounted to the headliner for rotation about an axis extending transversely of the vehicle.

14. A sun visor system according to claim 13, wherein said insert visors comprise plastic plates.

15. A sun visor system according to claim 14, wherein said insert visors comprise polycarbonate plates.

16. A sun visor system according to claim 13, wherein said pocket comprises a space extending rearward of the vision unit between a roof skin and a headliner panel.

17. A sun visor system according to claim 13, wherein said pocket comprises a molded plastic housing mounted to a roof skin of the vehicle rearward of the vision unit.

18. A sun visor system according to claim 13, wherein said sliding carrier visor and said insert visors are movable from their stowed positions to their deployed positions by at least one motor drive.

\* \* \* \* \*